(12) United States Patent
Thapliyal

(10) Patent No.: US 9,400,833 B2
(45) Date of Patent: Jul. 26, 2016

(54) GENERATING ELECTRONIC SUMMARIES OF ONLINE MEETINGS

(71) Applicant: Citrix Systems, Inc., Fort Lauderdale, FL (US)

(72) Inventor: Ashish V. Thapliyal, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 333 days.

(21) Appl. No.: 14/081,157

(22) Filed: Nov. 15, 2013

(65) Prior Publication Data

US 2015/0142800 A1    May 21, 2015

(51) Int. Cl.
   *G06F 17/00* (2006.01)
   *G06F 17/30* (2006.01)
   *G06Q 10/10* (2012.01)

(52) U.S. Cl.
   CPC .... *G06F 17/30598* (2013.01); *G06F 17/30719* (2013.01); *G06Q 10/10* (2013.01)

(58) Field of Classification Search
   CPC .................................................. G06F 17/30719
   See application file for complete search history.

(56) References Cited

U.S. PATENT DOCUMENTS

| | | | | |
|---|---|---|---|---|
| 7,082,430 B1* | 7/2006 | Danielsen | ........... | G06F 17/3056 |
| 7,340,483 B1* | 3/2008 | Gauthier | ........... | G06F 17/30038 |
| 8,229,905 B2* | 7/2012 | McFarland | ........ | G06F 17/30011 |
| | | | | 707/695 |
| 8,296,797 B2* | 10/2012 | Olstad | ............... | G06F 17/30796 |
| | | | | 725/37 |
| 8,914,452 B2* | 12/2014 | Boston | ............... | G06K 9/00751 |
| | | | | 709/206 |
| 2003/0078970 A1* | 4/2003 | Leaders | ................. | G06Q 10/10 |
| | | | | 709/204 |
| 2005/0038914 A1* | 2/2005 | Prendergast | ........... | G06Q 30/02 |
| | | | | 709/250 |
| 2005/0171947 A1* | 8/2005 | Gautestad | ........... | G06F 17/3089 |
| 2005/0235062 A1* | 10/2005 | Lunt | ...................... | G06Q 10/10 |
| | | | | 709/225 |
| 2006/0245616 A1* | 11/2006 | Denoue | .............. | G06K 9/00711 |
| | | | | 382/100 |
| 2007/0219970 A1* | 9/2007 | Dunie | ............... | G06F 17/30011 |
| 2008/0040674 A1* | 2/2008 | Gupta | ............... | G06F 17/30884 |
| | | | | 715/745 |
| 2008/0235564 A1* | 9/2008 | Erol | ................... | G06F 17/30905 |
| | | | | 715/202 |
| 2009/0018903 A1* | 1/2009 | Iyer | ........................ | G06Q 10/10 |
| | | | | 705/14.14 |
| 2009/0193327 A1* | 7/2009 | Roychoudhuri | ...... | G06F 17/241 |
| | | | | 715/231 |
| 2010/0228825 A1* | 9/2010 | Hegde | .................. | G06F 21/6218 |
| | | | | 709/204 |
| 2010/0235446 A1* | 9/2010 | Hehmeyer | ......... | H04N 21/8358 |
| | | | | 709/205 |
| 2011/0191328 A1* | 8/2011 | Vernon | .................. | G11B 27/28 |
| | | | | 707/723 |
| 2011/0231769 A1* | 9/2011 | Tovar | ..................... | H04L 63/10 |
| | | | | 715/735 |
| 2012/0011249 A1* | 1/2012 | Wong | ..................... | G06Q 10/10 |
| | | | | 709/224 |

(Continued)

*Primary Examiner* — Laurie Ries

(74) *Attorney, Agent, or Firm* — BainwoodHuang

(57) ABSTRACT

An improved technique of organizing content of online meetings involves generating an electronic summary based on a textual metadata derived from content presented in an online meeting. An online meeting server collects content such as audio, video, and slide files presented in a particular online meeting. From metadata associated with such content, the online meeting server generates an electronic summary of the particular online meeting which includes a textual description of the content. The online meeting server then stores the electronic summary and the content presented in the particular online meeting in a repository that is configured to store content from other online meetings.

19 Claims, 10 Drawing Sheets

(56) References Cited

U.S. PATENT DOCUMENTS

| | | | | |
|---|---|---|---|---|
| 2012/0096084 A1* | 4/2012 | Grigsby | G06Q 50/01 | 709/204 |
| 2012/0106925 A1* | 5/2012 | Dirik | H04N 5/147 | 386/240 |
| 2013/0007123 A1* | 1/2013 | Crosbie | H04L 63/107 | 709/204 |
| 2013/0110937 A1* | 5/2013 | Burns | G06Q 10/103 | 709/205 |
| 2013/0339431 A1* | 12/2013 | Yannakopoulos | H04L 12/1827 | 709/204 |
| 2014/0013220 A1* | 1/2014 | Ohguro | G06F 17/22 | 715/256 |
| 2014/0019858 A1* | 1/2014 | McAllister | G09G 5/026 | 715/273 |
| 2014/0032513 A1* | 1/2014 | Gaither | G06F 17/2211 | 707/698 |
| 2014/0129942 A1* | 5/2014 | Rathod | H04N 21/44222 | 715/720 |
| 2014/0188540 A1* | 7/2014 | Cole | G06Q 10/1095 | 705/7.19 |
| 2015/0067476 A1* | 3/2015 | Song | G06F 17/2247 | 715/234 |

* cited by examiner

GENERATING ELECTRONIC SUMMARIES OF ONLINE MEETINGS

BACKGROUND

A web conference typically shares visual data and voice data among multiple meeting participants. To create a web conference, the conference participants connect their respective client devices to a conference server through a network, e.g., the Internet. The conference server typically processes visual data (e.g., a desktop view from a presenting participant containing slides being presented, a camera view from each conference participant, etc.) and provides that visual data for display on respective display screens so that all conference participants are able to view the visual data. Additionally, the conference server typically combines voice data from all of the conference participants into a combined audio feed and shares this combined audio feed with all of the conference participants. Accordingly, conference participants are able to watch visual content, as well as ask questions and inject comments to form a collaborative exchange even though the conference participants may be scattered among remote locations.

Some conventional conference servers are capable of recording web conferences. As a result, a participant of a web conference or someone who missed the web conference is able to play back the web conference (e.g., to access a particular content) at a later time. An online meeting system which operates in a manner similar to that described above is disclosed in U.S. patent application Ser. No. 12/978,214, entitled "SYSTEMS, METHODS, AND DEVICES FOR GENERATING A SUMMARY DOCUMENT OF AN ONLINE MEETING," the teachings of which are hereby incorporated by reference in their entirety.

SUMMARY

Unfortunately, it is difficult to locate content from web conferences held previously. Along these lines, suppose that a conference participant missed a portion of a conference and wants to find the content that was missed. Typically, other conference participants may not think to place content in a common storage area in such a way that makes it easy for this participant to find that content. Instead, because multiple people manage various content of an online meeting, that content may not have a consistent identity; consequently, particular content may be difficult to locate.

This burden of locating content presented in an online meeting becomes even more difficult when, as is typical, the conference participant wishes to choose content among that presented during several previous web conferences. For example, as mentioned above, conventional conference servers are capable of recording web conferences. It is unwieldy, however, to listen through recordings of previous web conferences to locate particular content of interest.

In contrast with the above-described conventional conference servers by which it is difficult to locate content from previous conferences, an improved technique involves generating an electronic summary based on textual metadata derived from content presented in an online meeting. Along these lines, an online meeting server collects content presented in a particular online meeting. In order to allow a participant to easily locate content presented in the online meeting, the online meeting server uses metadata associated with the content—for example, font sizes associated with text which may imply degree of relevance of the text to the topic discussed at the meeting—to generate an electronic summary of the particular online meeting which includes a textual description of the content, for example a list of slide titles or keywords. Even when the online meeting server stores the electronic summary and the content among content from other online meetings, the participant may use a navigation tool such as a search engine to find desired content from the textual description in the electronic summary.

Advantageously, the improved technique allows an online meeting participant to quickly search through the electronic summary for content presented in an online meeting without having to wade through the content of other online meetings. As the electronic summary extracts content based on textual metadata from the content presented during online meetings, the electronic summary contains easily searchable identifiers that help such a participant locate desired content quickly. Using this textual metadata, for example, an online meeting server may determine which content presented in the online meeting is most important and can filter out everything else. This filtering may help the participant locate desired content with minimal effort.

One embodiment of the improved technique is directed to a method of organizing content of online meetings. The method includes collecting first content presented during a first online meeting. The method also includes generating an electronic summary of the first online meeting, the electronic summary providing a textual description of the first content of the first online meeting based on textual metadata derived from the first online meeting. The method further includes storing the electronic summary and the first content of the first online meeting in a repository, the repository also storing second content of a second online meeting.

In some arrangements, the first content includes a set of slides presented during the first online meeting, each slide of the set of slides including a title. Generating the electronic summary includes, for each slide, identifying the title of that slide from the textual metadata derived from the first online meeting, and storing the titles in a title array within the electronic summary, the textual description of the content being derived from the titles in the title array.

In some arrangements, generating the electronic summary further includes removing titles from the title array that are identical to a particular title to produce a set of remaining titles, and performing a concatenation operation on the set of remaining titles, the concatenation operation being configured to concatenate the set of remaining titles to produce a summary paragraph within the electronic summary.

In some arrangements, each title in the title array contains a set of words and the repository also stores a list of uncommon words. Generating the electronic summary further includes removing titles from the title array that do not contain any words contained in the list of uncommon words.

In some arrangements, generating the electronic summary includes, for each slide, identifying subtitles of that slide from the textual metadata derived from the first online meeting, and storing the subtitles in the title array, the textual description of the content also being derived from the subtitles in the title array.

In some arrangements, identifying the subtitles of that slide from the textual metadata includes, for each subtitle, obtaining a numerical value from the textual metadata indicative of how that subtitle is displayed in that slide. Storing the subtitles in the title array includes for each subtitle, providing a decision to store or not store that subtitle in the title array based on the numerical value.

In some arrangements, the numerical value is indicative of a font size of that subtitle. Providing the decision to remove or not remove that subtitle from the title array based on the numerical value includes comparing the font size to a threshold font size, not storing that subtitle in the title array when the font size of that subtitle is smaller than a threshold font size, and storing that subtitle in the title array when the font size of that subtitle is greater than or equal to the threshold font size.

In some arrangements, the numerical value is indicative of a length of time that slide was displayed during the first online meeting. Storing the subtitles in the title array includes ranking the subtitles according to the numerical value. Providing the decision to store or not store that subtitle in the title array based on the numerical value includes storing a subtitle in the title array when the subtitle is ranked above a threshold ranking, and not storing a subtitle in the title array when the subtitle is ranked below the threshold ranking.

In some arrangements, the method further comprises, prior to providing the decision, producing the threshold ranking according to a prespecified length limit.

In some arrangements, the method further comprises storing words contained in both the titles in the title array and the uncommon word list in a list of keywords within the respective electronic summary, and not storing words contained in the titles in the title array but not in the uncommon word list in the list of keywords within the respective electronic summary.

In some arrangements, storing the words contained in both the titles in the title array and the uncommon word list in a list of keywords within the respective electronic summary includes storing the words contained in both the subtitles in the title array and the uncommon word list in a list of keywords within the respective electronic summary.

In some arrangements, storing the words contained in both the titles and subtitles in the title array and the uncommon word list in a list of keywords includes ranking the words in the list of keywords according to a numerical value indicative of a length of time that slide was displayed during the particular online meeting, and removing particular words from the list of keywords when the particular words are ranked below a threshold ranking.

In some arrangements, at least one slide of the set of slides is a summary slide containing a set of sentences. Generating the electronic summary includes, for the summary slide, storing each sentence of the set of sentences in the title array.

In some arrangements, generating the respective electronic summary includes performing an optical character recognition (OCR) operation on particular content of the first online meeting to produce words of the electronic summary.

In some arrangements, performing the OCR operation on the particular content includes measuring style including height, color, emphasis, and font of characters of the words of the respective electronic summary within the particular content. Generating the electronic summary further includes identifying a title of the first content based on the measured styles of the characters of the words of the electronic summary within the first content.

In some arrangements, the repository stores a second electronic summary of the second online meeting. The method further comprises providing a navigation tool to a user, the navigation tool enabling a user to perform a search over the first electronic summary and the second electronic summary to find particular content presented during the first online meeting and the second online meeting.

In some arrangements, the electronic summary further includes text formatted according to a markup language configured to provide links to particular content of the first online meeting. Providing the navigation tool to the user includes displaying hyperlinks within the electronic summary that, when clicked on by the user, display particular content of the first content of the first online meeting.

In some arrangements, the first content includes a set of images presented during the first online meeting. The electronic summary further includes thumbnail image for each of the set of images. Providing the navigation tool to the user further includes embedding a hyperlink to the images within the thumbnail images.

Additionally, some embodiments of the improved technique are directed to an apparatus constructed and arranged to organizing content of online meetings. The apparatus includes memory and a set of processors coupled to the memory to form controlling circuitry. The controlling circuitry is constructed and arranged to carry out the method of organizing content of online meetings.

Furthermore, some embodiments of the improved technique are directed to a computer program product having a non-transitory computer readable storage medium which stores code including a set of instructions which, when executed by a computer, cause the computer to carry out the method of organizing content of online meetings.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique of organizing content of online meetings involves generating an electronic summary based on a textual metadata derived from content presented in an online meeting. An online meeting server collects content such as audio, video, and slide files presented in a particular online meeting. From metadata associated with such content, the online meeting server generates an electronic summary of the particular online meeting which includes a textual description of the content. The online meeting server then stores the electronic summary and the content presented in the particular online meeting in a repository that is configured to store content from other online meetings.

Advantageously, the improved techniques allow an online meeting participant to quickly search through the electronic summary for content presented in an online meeting without having to wade through the content of other online meetings. As the electronic summary extracts content based on textual metadata from the content presented during online meetings, the electronic summary will contain easily searchable identifiers that help such a participant locate desired content quickly. Using this textual metadata, for example, an online meeting server may determine which content presented in the online meeting is most important and can filter out everything else. This filtering may help the participant locate desired content with minimal effort.

Figure 1:
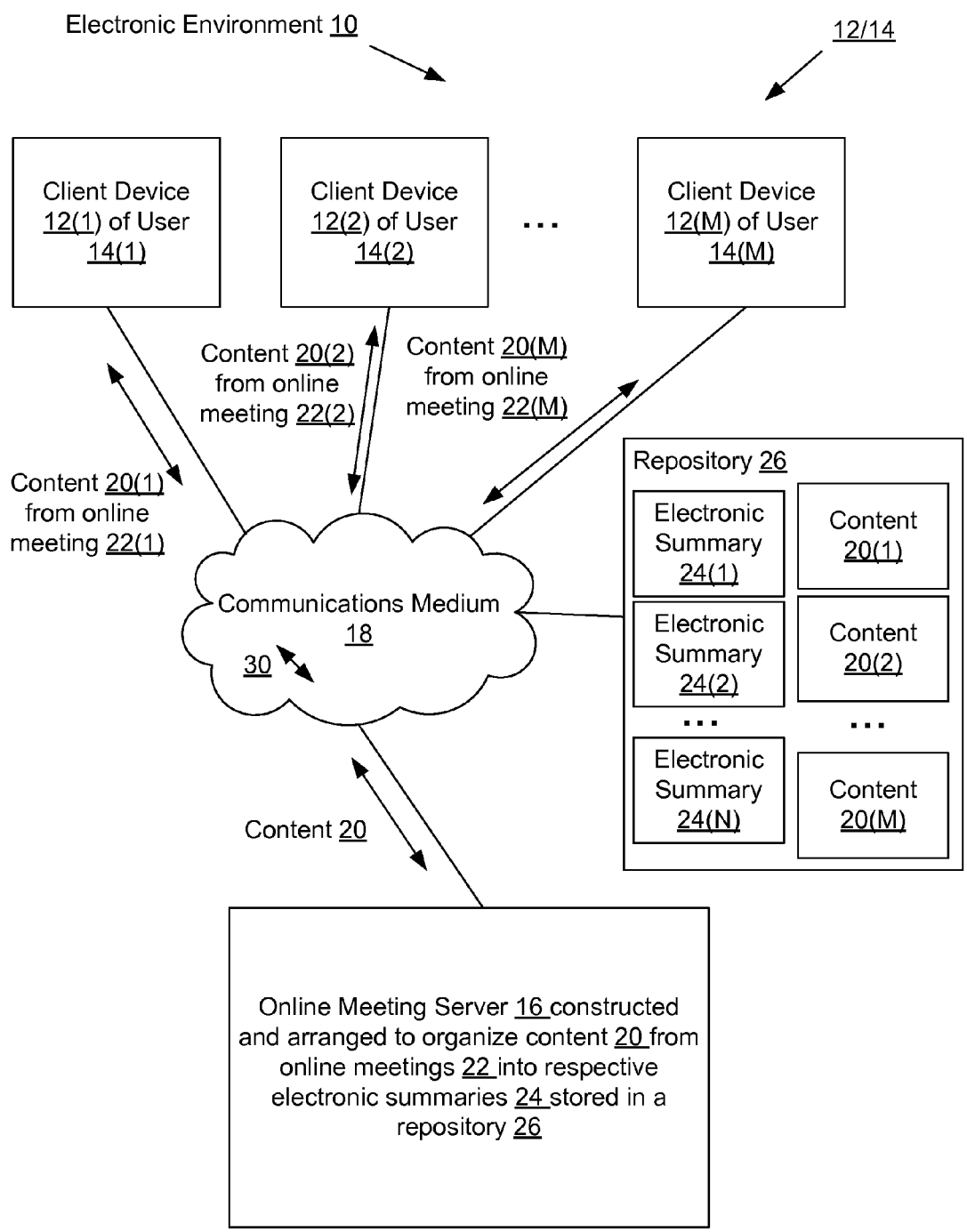
FIG. 1 is a block diagram illustrating an example electronic environment in which the improved technique may be carried out.

FIG. 1 illustrates an example electronic environment 10 in which the improved technique may be carried out. Electronic environment 10 includes client devices 12(1), 12(2), ..., 12(M) (client devices 12), where M is the number of client devices, online meeting server 16, communications medium 18, and repository 26.

Client devices 12 are typically desktop PCs, although client devices 12 can be any electronic computing device, e.g., laptop computer, tablet computer, smartphone, and the like. Each client device 12 is constructed and arranged to operate an online meeting client, as well as perform other useful work on behalf of a respective user 14. For example, client device 12(1) enables user 14(1) to participate in online meetings, client device 12(2) enables user 14(2) to participate in online meetings, and so on. Examples of other useful work include enabling respective users 14 to access the Internet via a browser application, operating as a word processor, allowing respective users 14 to read and send email, and so on.

Online meeting server 16 is constructed and arranged to host online meetings 22 among users 14, as well as automatically collect and store online meeting content 20 from one or more programs in repository 26. Online meeting server 16 is also constructed and arranged to generate electronic summaries 24 of online meetings and store electronic summaries 24 in repository 26.

Communications medium 18 is constructed and arranged to connect the various components of electronic environment 10 together to enable these components to exchange electronic signals 30. At least a portion of communications medium 18 is illustrated as a cloud in FIG. 1 to indicate that communications medium 18 is capable of having a variety of different topologies including backbone, hub-and-spoke, loop, irregular, combinations thereof, and so on. Along these lines, communications medium 18 may include copper-based communications devices and cabling, fiber optic devices and cabling, wireless devices, combinations thereof, etc. Furthermore, communications medium 18 is capable of supporting LAN-based communications, cellular communications, standard telephone communications, combinations thereof, etc.

Repository 26 is constructed and arranged to store online meeting content 20 and electronic summaries 24 so that they are accessible to users 14 either via communications medium 18 or directly via, e.g., cabling. Repository 26 may take the form of a magnetic storage device, a solid state storage device, and the like.

Content 20 includes audio, visual, and textual data presented during online meeting 22 and other, previous online meetings. For example, content 20(1) includes slides presented during a slide show, while content 20(2) includes audio presented during the slide show. Further, content 20 includes textual metadata corresponding to, e.g., slides, audio, etc. Such textual metadata includes descriptions of font types, font sizes, slide numbers, file format types, text identifiers, etc.

Electronic summaries 24 are files having a particular format that include text and other media (e.g., graphics, video, etc.). Electronic summary 24(1) is configured to provide a succinct description of online meeting 22 by including only text that online meeting server 16 determines to be most relevant to online meeting 22, as well as other media that online meeting server 16 determines to be relevant to online meeting 22. Electronic summary 22(1) is formatted, for example, to have a title, a summary paragraph, graphics and/or text that link to content 20 within repository 26, and in some arrangements, a list of keywords. Other electronic summaries 24(2), 24(3), ..., 24(N) are similarly formatted and correspond to previous online meetings.

During operation, each client device 12 runs a set of applications to carry out an online meeting 22 which shares online meeting content 20 among users 14 via communications medium 18. For example, user 14(1) may initially be a presenter and run a slide show program that displays slides from a slide file. Other users 14(2), ..., 14(M) may participate in online meeting 22 as attendees to watch the slide show. User 14(1), as presenter, speaks into a microphone in client device 12(1) to provide audio corresponding to each slide in the slide file. Each user 14 may also use microphones and cameras in respective client devices 12 to transmit audio and video to online meeting server 16, which then processes accompanying audio and video data for presentation to other client devices 12. Furthermore, at some point during online meeting 22, one of the other users 14(2), ..., 14(M) may take over as presenter and run some other application, e.g., a word processor application, a spreadsheet application, or the like. As a result, online meeting participants are able to share visual content, as well as ask questions and inject comments to form a collaborative exchange even though the participants may be dispersed across various remote locations.

As online meeting 22 is conducted, online meeting server 16 collects content 20 presented during online meeting 22. For example, online meeting server 16 collects data and metadata corresponding to a slide file containing slides presented during online meeting 22. Further, online meeting server 16 also collects audio data spoken by a presenter describing the slides. In some arrangements, as part of the collecting, online meeting server 16 maps portions of the audio data to particular slides that the audio describes; this mapping may involve keeping track of the times at which the presenter changes slides. Further details of such collection processes are disclosed in U.S. patent application Ser. No. 14/015,091, entitled "ACQUIRING ONLINE MEETING DATA RELATED TO AN ONLINE MEETING," the contents of which are hereby incorporated by reference in their entirety.

After online meeting server 16 conducts online meeting 22, online meeting server 16 generates electronic summary 24(1) of online meeting 22. For example, online meeting server 16 extracts titles of slides in a slide file 20(1). Online meeting server 16 is able to identify titles of the slides of the textual metadata of content 20(1) that identifies the types of text in the slides (e.g., titles, subtitles, body, etc.). Online meeting server places each slide title into memory, as will be detailed in FIG. 2.

Figure 2:
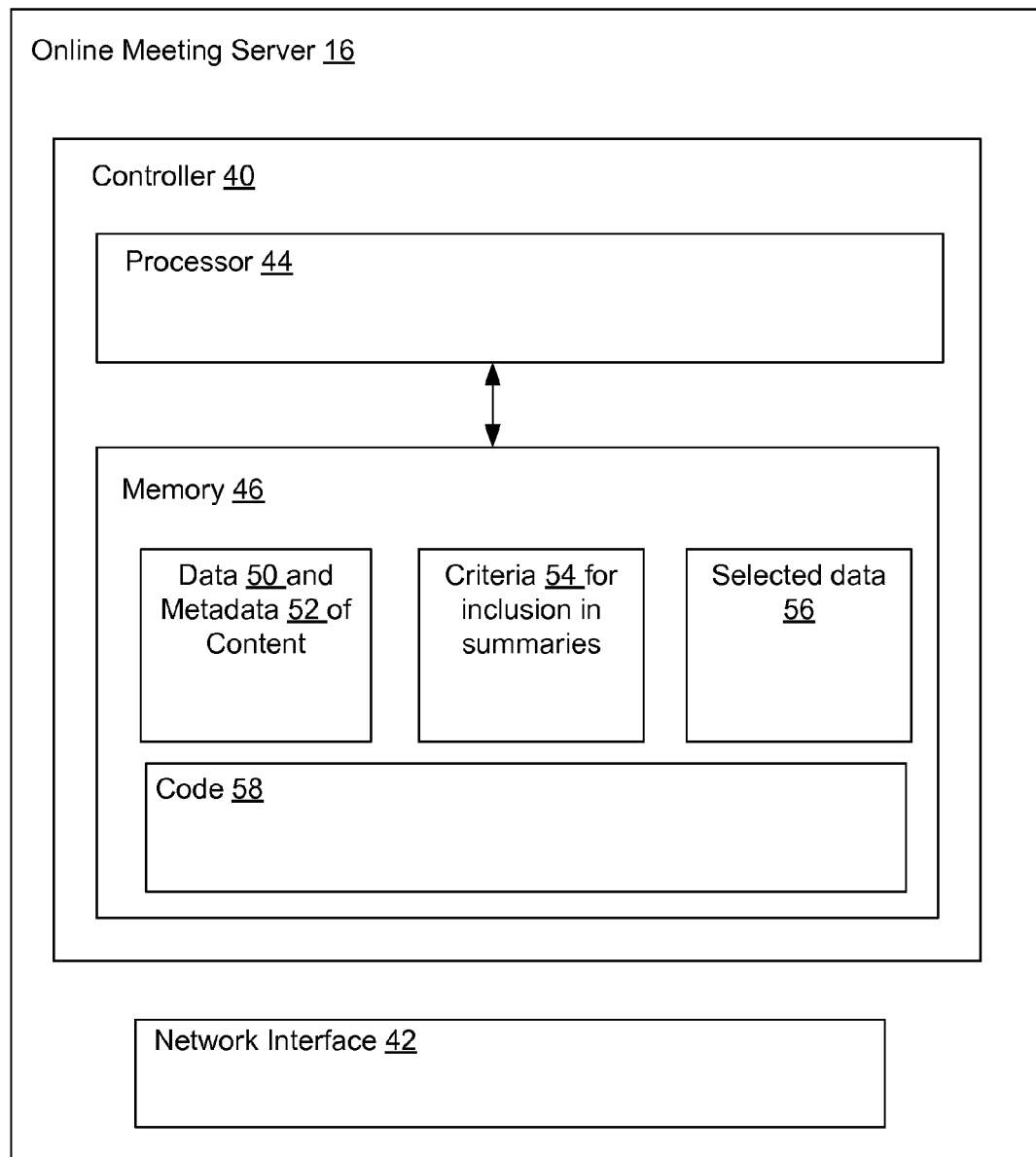
FIG. 2 is an example online meeting server within the electronic environment shown in FIG. 1.

FIG. 2 is a block diagram that illustrates further details of online meeting server 16. Online meeting server 16 includes controller 40, which in turn includes processor 44 and memory 46, and network interface 42.

Network interface 42 is constructed and arranged to provide connections for online meeting server 16 to communications medium 18. Network interface 42 takes the form of an Ethernet card; in some arrangements, network interface 42 takes other forms including a wireless receiver and a token ring card.

Processor 44 takes the form of, but is not limited to, Intel or AMD-based CPUs, and can include a single or multi-cores each running single or multiple threads. Processor 44 is coupled to memory 46 and is configured to execute instructions from code 58.

Memory 46 is configured to store code 58 that contains instructions to organize content from online meetings, including generating electronic summaries of the online meetings. To this effect, memory 46 is further configured to store data 50 and metadata 52 of content 20, criteria (e.g., thresholds) used to determine which data to include in electronic summaries 24, and arrays 56 for holding data selected according to criteria 54. Memory 46 generally takes the form of, e.g., random access memory, flash memory or a non-volatile memory.

Data 50 includes text, graphics, audio, video, etc., presented during online meeting 22. Each form of data 50 is included in a file that has a particular format. For example, data corresponding to a slide show is contained in a file formatted to be read by an application configured to read and edit slides on a client device 12. Each slide may contain text, graphics, and other media. The text in a slide has a text type that identifies the text as a title, a subtitle, of part of the body. The body may also form a hierarchy of text according to an outline format.

Metadata 52 serves to identify values of various identifiers associated with data 50. For example, metadata 52 may identify particular text in slides of content 20(1) as having a font size of 24 points, while other text in those slides is identified as having a font size of 14 points. Further, the 24-point text may be associated with text in titles, while the 14-point text is associated with text in the body. Metadata 52 is typically stored within a file associated with content 20.

Criteria 54 are configured to identify the data 50 to be included in electronic summaries 24. Criteria 54 relate to values extracted in metadata 52 and may take the form of a threshold value, e.g., font size, below which the data is not to be included in electronic summaries 24. Criteria 54 may also take the form of text types that are to be included in electronic summaries 24 (e.g., 'title', 'subtitle'), and levels of the body below which are not included (e.g., when a text body has 3 levels of hierarchy, only use the first two levels).

Array 56 stores data 50 satisfying criteria 54; processor 44 will write data 50 in arrays 56 to electronic summaries 24. For example, suppose that criteria 54 specifies that only titles of slides are to be written to electronic summaries 24. Then each element of array 56 is text of a title.

Prior to writing data 50 in array 56 to electronic summaries 24, processor 44 may perform additional processing of data 50 in array 56 to further increase the relevance of electronic summaries 24 in summarizing content on online meetings 22. In one example, processor 44 removes duplicate entries (e.g., titles) from array 56. Other examples are discussed below in connection with FIGS. 3-6.

Figure 3:
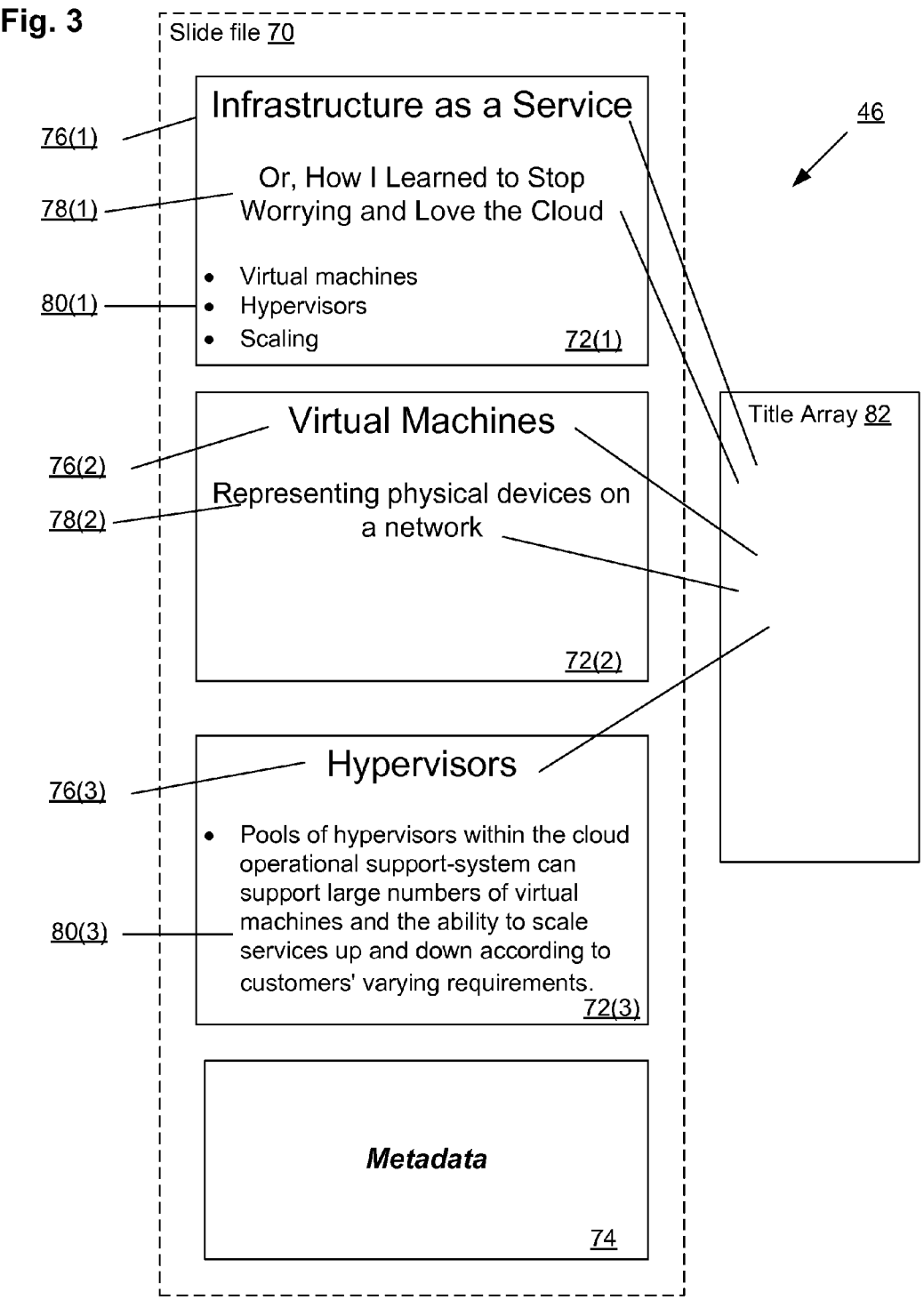
FIG. 3 is a block diagram illustrating an example slide file having content being extracted by the online meeting server shown in FIG. 2.

FIG. 3 is a block diagram illustrating an example slide file 70 presented in online meeting 22 and used in the generation of an electronic summary 24(1). Slide file 70 includes slides 72(1), 72(2), and 72(3), as well as metadata 74.

As described above, each slide 72(1), 72(2), and 72(3) has a respective title 76(1), 76(2), and 76(3). It is assumed that the title of a slide represents the most relevant description of that slide. For example, the title 76(1) of slide 72(1) is "Infrastructure as a Service"; everything that follows in the slide concerns various aspects of Infrastructure as a Service. Accordingly, processor 44 of online meeting server 16 acts to identify text in title 76(1) as being a title from metadata 74. After identifying title 76(1), processor 44 stores the text of title 76(1) in title array 82 stored in memory 46. Processor 44 repeats this process of identifying titles from metadata 74 and storing the identified titles in entries of title array for other slides 72(2), 72(3) (in general, for any number of slides), until all slides have had their titles identified.

In some arrangements, when criteria 54 allows text identified as a subtitle by metadata to be included in title array 82, processor 44 extracts subtitles 78(1) and 78(2) from slides 72(1) and 72(2) (in this example, slide 72(3) has no subtitle) and places them in entries in title array 82. Similarly, processor 44 may also extract other text allowed in criteria 54, such as body 80(1) and 80(3), and place it into title array 82.

Figure 4:
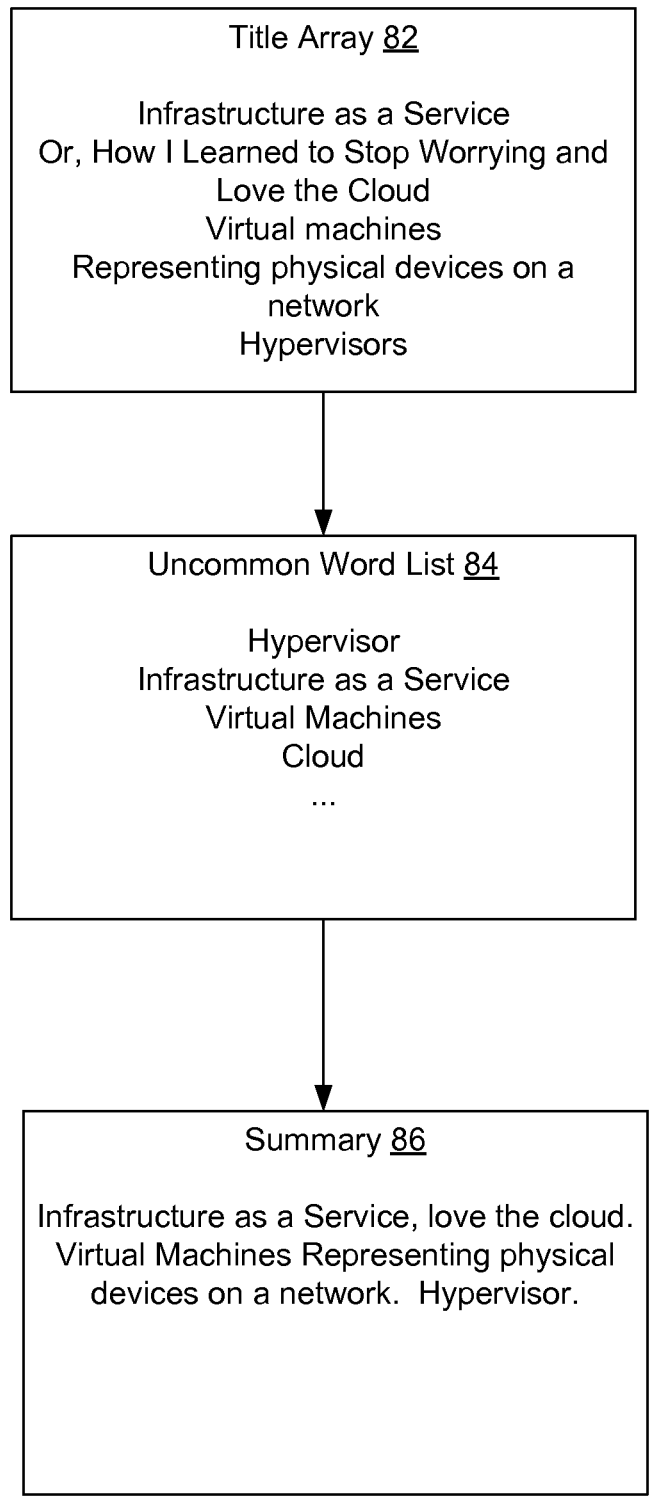
FIG. 4 is a block diagram illustrating an example extraction of summary text by the online meeting server shown in FIG. 2.

FIG. 4 is a block diagram illustrating an additional example post-processing step on title array 82. As illustrated, entries of title array 82 include titles and subtitles taken from slides 72 (see FIG. 3). As part of criteria 54 (see FIG. 2), memory 46 stores an uncommon word list 84 containing words that are expected to be relevant to online meeting 22. Such an uncommon word list 84 may be generated by, e.g., a meeting participant or an administrator. Code 58 then contains instructions for processor 44 to compare words in entries of title array 82 to words in uncommon word list 84 and extract those titles that do not contain any of the words in uncommon word list 84. Processor 44 then writes the remaining entries in title array 82 into electronic summary 86.

Figure 5:
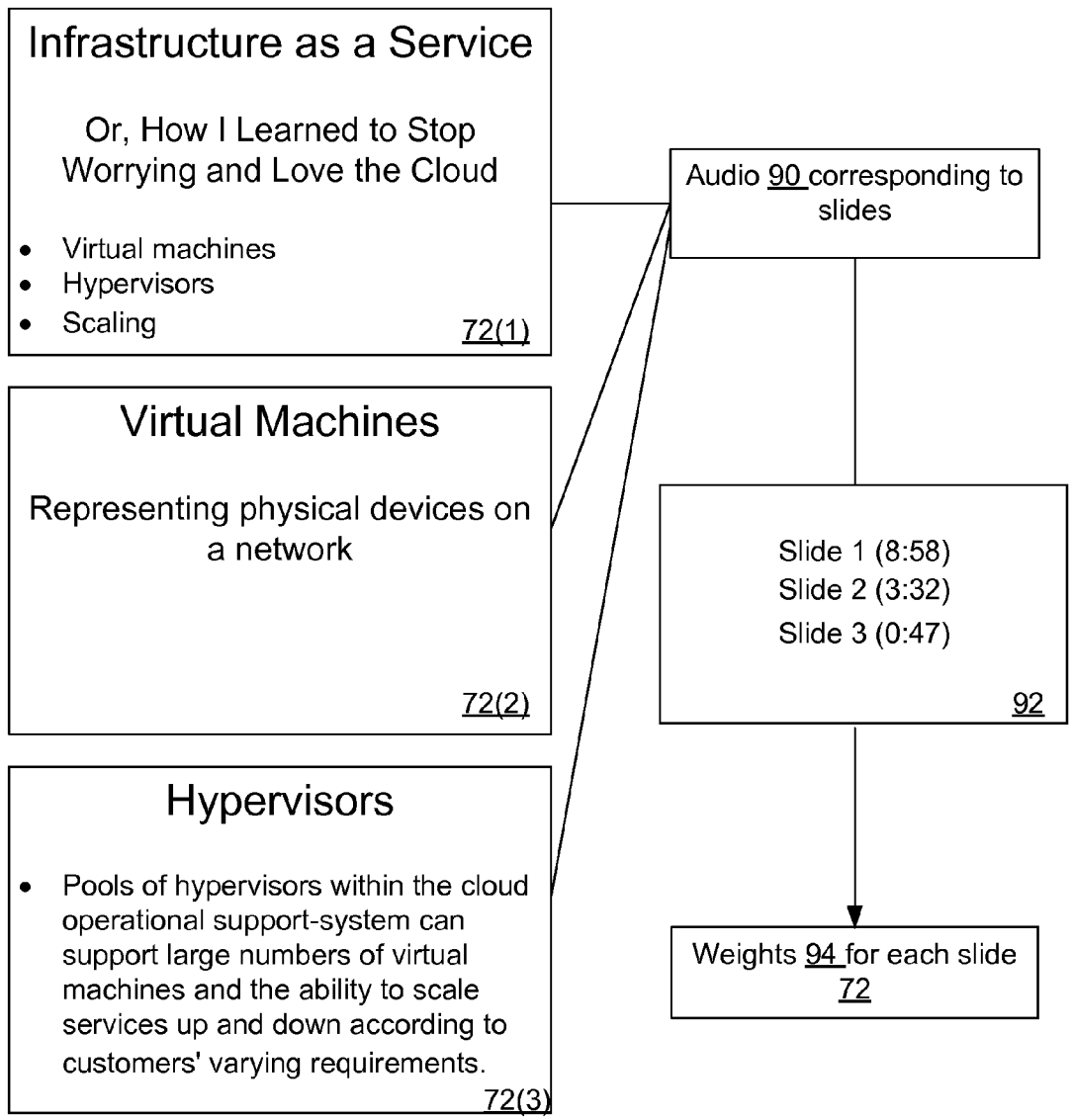
FIG. 5 is a block diagram illustrating another example extraction of summary text by the online meeting server shown in FIG. 2.

FIG. 5 is a block diagram illustrating an example generation of criteria 54 for a post-processing step on title array 82. In this case, code 58 contains instructions for processor 44 to assign weights to slides 72(1), 72(2), etc., based on an amount of time a presenter spent speaking about each slide in audio 90. To accomplish this, processor 44 determines the times at which the presenter changed slides in online meeting 22. Processor 44 then assigns weights 94 to each slide according to the length of time between slide changes. In the example illustrated in FIG. 5, the presenter spent 8 minutes and 58 seconds on slide 72(1), 3 minutes and 32 seconds on slide 72(2), and 47 seconds on slide 72(3). Weights 94 may be the number of seconds spent on each slide, although other possibilities for computing weights 94 are possible.

Figure 6:
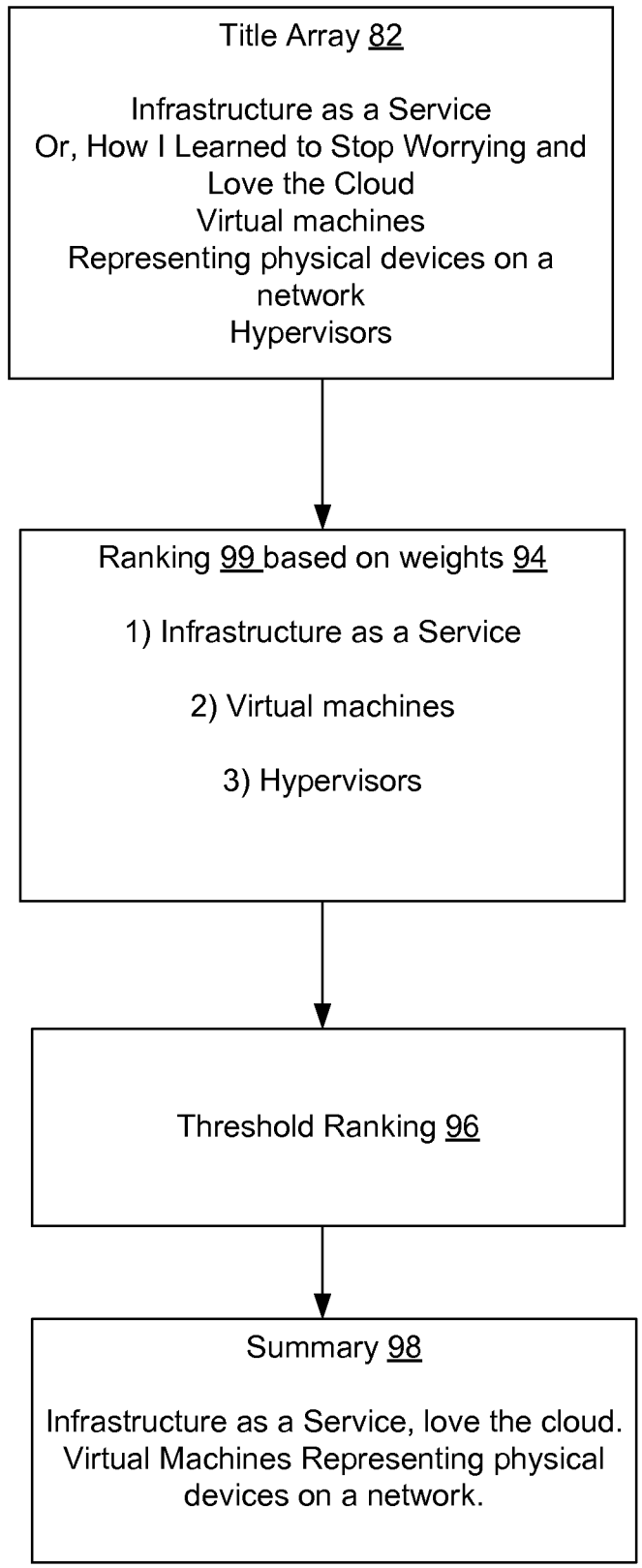
FIG. 6 is a block diagram illustrating another example extraction of summary text by the online meeting server shown in FIG. 2.

FIG. 6 is a block diagram illustrating an additional example post-processing step on title array 82 using weights 94 generated by presentation times as described above in connection with FIG. 5. In this case, code 58 contains instructions for processor 44 to produce a ranking 99 of slides 72(1), 72(2), and 72(3) according to their weights. Criteria 54 in this case can only accept entries in title array above a threshold 96, e.g., corresponding to a ranking of 1 or 2; such a ranking would cause processor 44 to remove entries in title array 82 corresponding to slide 72(3). Processor 44 then writes the remaining entries of title array 82 to form summary 98.

It should be understood that the above examples are not meant to represent all possibilities and other criteria 54 for filtering title array 82 are possible.

Figure 7:
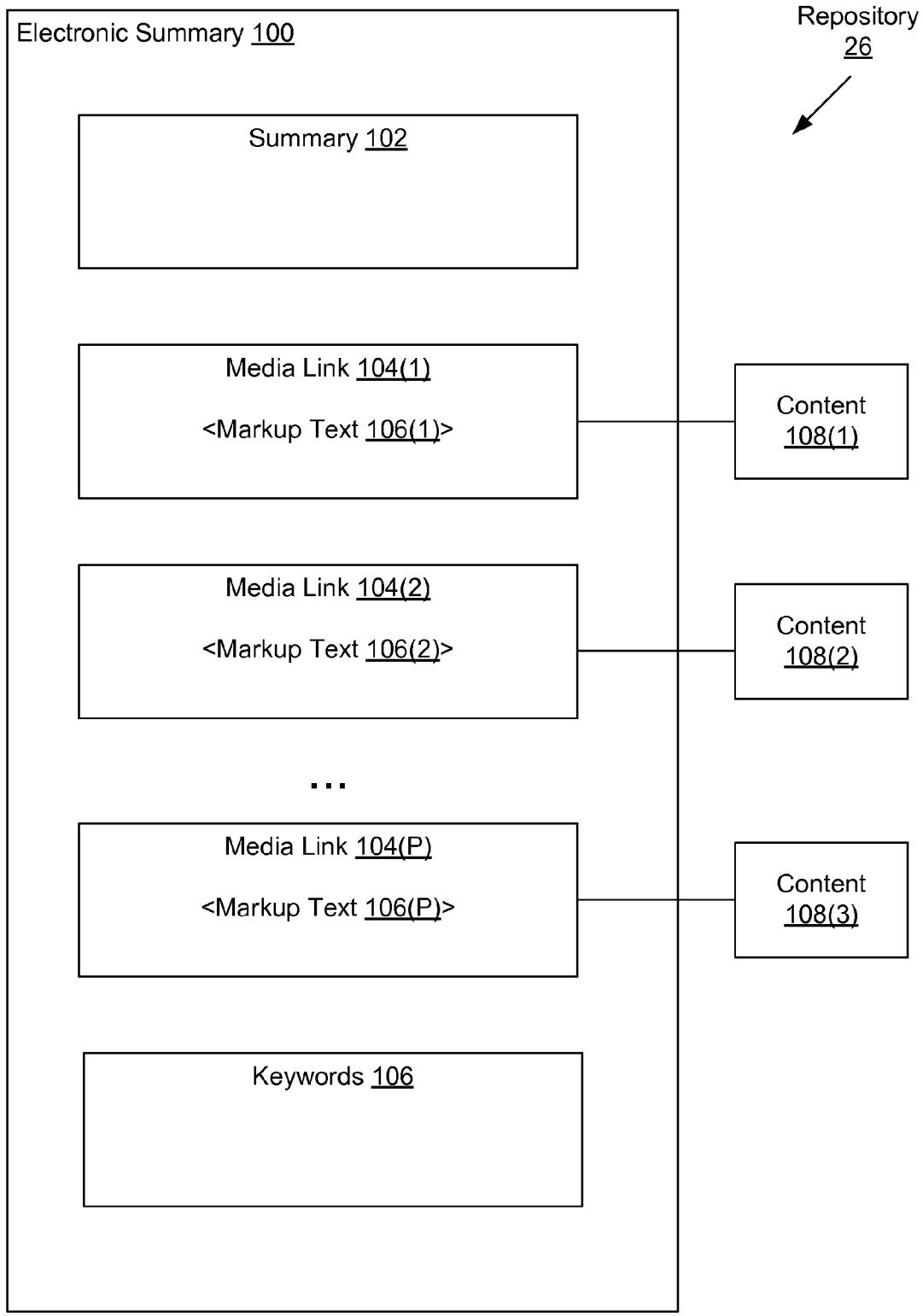
FIG. 7 is a block diagram illustrating an example electronic summary generated by the online meeting server shown in FIG. 2.

FIG. 7 is a block diagram illustrating the structure of an example electronic summary 100 stored in repository 26. Electronic summary 100 contains a summary 102, media links 104(1), 102(2), . . . , 104(P), where P is the number of media links in electronic summary 100. In some arrangements, electronic summary 100 also contains a set of keywords 106.

Summary 102 includes a paragraph of text derived from titles of slides as described above in connection with FIGS. 3-6. Summary 102 is designed to be quickly read by a user 14 in order to understand the main ideas discussed in online meeting 22.

Media links 104(1), 102(2), . . . , 104(P) each may be a graphic or text that is configured to provide a link to respective content 108(1), 108(2), . . . , 108(P) stored in repository 26. For example, a link 104(1) may be a thumbnail graphic of a slide that points to the particular place in audio file 90 where the discussion of the slide begins. Furthermore, in some arrangements, the link 104(1) may provide an index into more than one content file. For example, an audio recording of a meeting may be split into separate files and media link 104(1) may index into one of these files. Each media link contains respective markup text 106(1), 106(2), . . . , 106(P) expressed in a markup language, e.g., HTML, DHTML, XML, or the like.

Generation of media links 104(1), etc., follow from the process describe in connection with FIG. 5 above. Each slide 72(1), etc., is associated with a timestamp in audio file 90, so that processor 44 generates links 104(1), etc., based on these timestamps.

Keywords 106 contain a list of words used in the presentation according to their relative importance to online meeting 22. Keywords 106 are configured to be searched by a navigation tool such as a browser in order for a user 14 to quickly locate electronic summary 100. In some arrangements, processor 44 arranges keywords 106 according to importance to online meeting 22 by displaying keywords 106 in different font sizes.

Further details of the generation of keywords 106 are described below in connection with FIG. 8.

Figure 8:
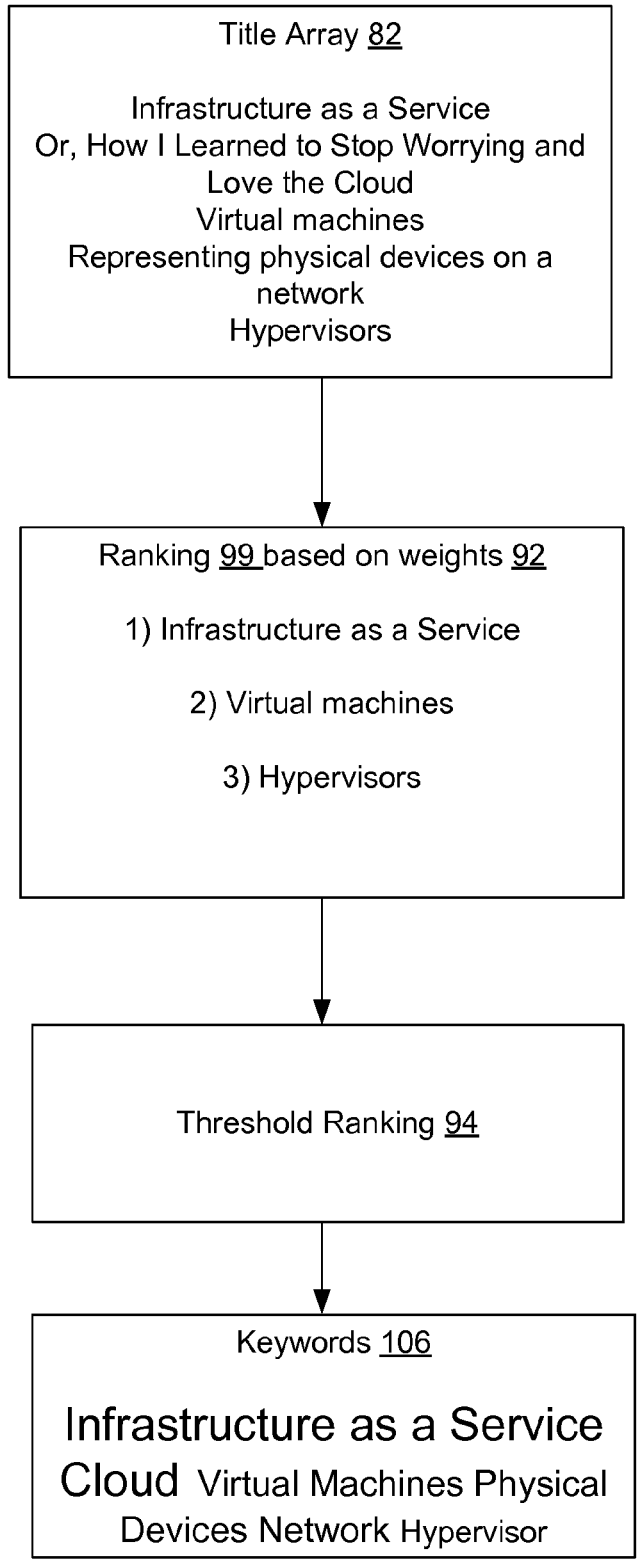
FIG. 8 is a block diagram illustrating an example keyword generation within the electronic summary shown in FIG. 7.

FIG. 8 is a block diagram illustrating an example generation of keywords 106 within electronic summary 100. Processor 44 uses the weights of titles 92 as described above in connection with FIG. 5. Processor 44 then selects words from the titles 72(1), etc., and ranks the words in terms of importance (e.g., number of times mentioned in titles). Processor 44 may remove words used in lowly-ranked slides.

In some arrangements, processor 44 gives additional weight to statistically unlikely words and phrases. Processor 44 may also drop keywords if there is a prespecified limit on the number of keywords. (Processor 44 may take a similar action with respect to summary 102 if there is a length limit.)

In some further arrangements, processor 44 may assign font sizes to keywords as displayed within electronic summary 100 according to, e.g., frequency used in titles 72, or frequency used in audio 90.

Figure 9:
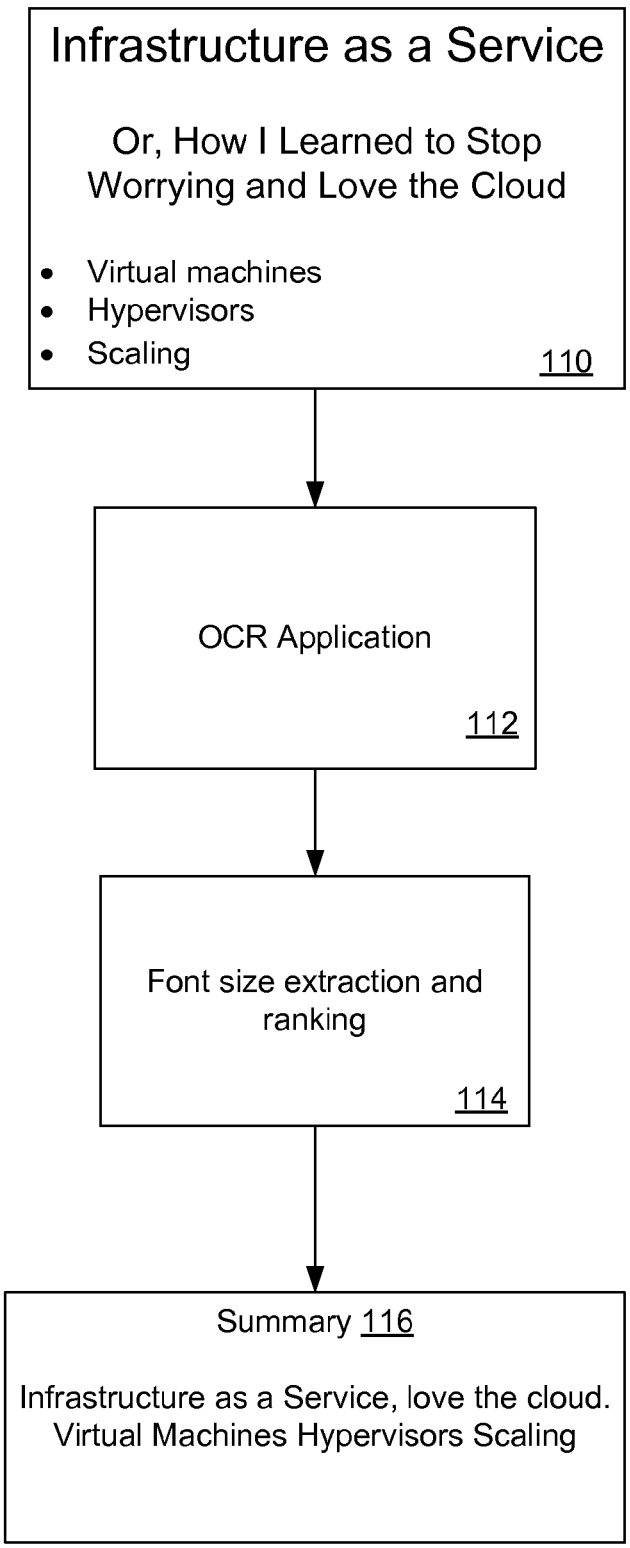
FIG. 9 is a block diagram illustrating an example extraction of summary text by the online meeting server shown in FIG. 2.

FIG. 9 illustrates an alternative way for processor 44 to generate an electronic summary from content 110. For example, if content 110 is a graphic containing words not formatted into text, code 58 may contain instructions for processor 44 to perform an optical character recognition (OCR) operation 112 on graphic 110. Processor 44 then performs a measurement operation 114 on content 110 to measure the style of the words, including size, color, font, and emphasis (e.g., bold, italics, underline, etc.). As part of operation 114, processor 44 ranks the text extracted via OCR operation 112 according to measured size (e.g., larger sizes are assumed to be more important). Processor 44 then may construct a summary 116 according to the process described above in connection with FIGS. 3-6.

Figure 10:
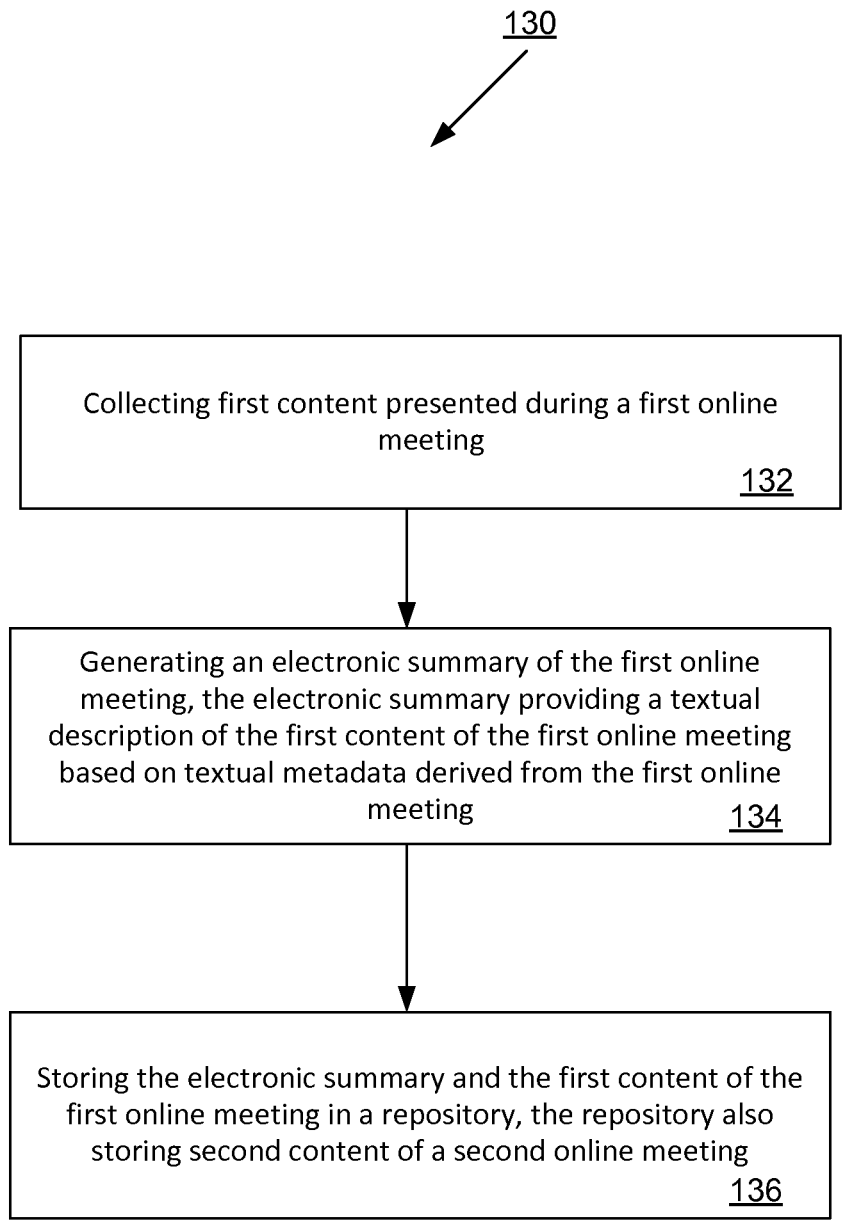
FIG. 10 is a flow chart illustrating another example method of carrying out the improved technique within the computing device shown in FIG. 1.

FIG. 10 is a flow chart illustrating a method 130 of organizing content of online meetings, including steps 132, 134, and 136. In step 132, first content presented during a first online meeting is collected by, for example, online meeting server 16. In step 134, an electronic summary of the first online meeting is generated by, e.g., online meeting server 16, the electronic summary providing a textual description of the first content of the first online meeting based on textual metadata derived from the first online meeting. In step 136, the electronic summary and the first content of the first online meeting are stored in a repository, e.g., repository 26 by, e.g., online meeting server 16, the repository also storing second content of a second online meeting As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

It should be understood that the improvement described here has a number of applications, including providing a technique for organizing content of an online meeting.

Having described certain embodiments, numerous alternative embodiments or variations can be made. Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of organizing content of online meetings, the method comprising:
    collecting first content presented during a first online meeting;
    generating an electronic summary of the first online meeting, the electronic summary providing a textual description of the first content of the first online meeting based on textual metadata derived from the first online meeting; and
    storing the electronic summary and the first content of the first online meeting in a repository, the repository also storing second content of a second online meeting;
    wherein the first content includes a set of slides presented during the first online meeting, each slide of the set of slides including a title; and
    wherein generating the electronic summary includes:
        for each slide, identifying the title of that slide from the textual metadata derived from the first online meeting, and
        storing the titles in a title array within the electronic summary, the textual description of the content being derived from the titles in the title array;

wherein each title in the title array contains a set of words;
wherein the repository also stores a list of uncommon words; and
wherein generating the electronic summary further includes:
  removing titles from the title array that do not contain any words contained in the list of uncommon words.

2. A method as in claim 1,
wherein generating the electronic summary further includes:
  removing titles from the title array that are identical to a particular title to produce a set of remaining titles; and
  performing a concatenation operation on the set of remaining titles, the concatenation operation being configured to concatenate the set of remaining titles to produce a summary paragraph within the electronic summary.

3. A method as in claim 1,
wherein generating the electronic summary includes:
  for each slide, identifying subtitles of that slide from the textual metadata derived from the first online meeting, and
  storing the subtitles in the title array, the textual description of the content also being derived from the subtitles in the title array.

4. A method as in claim 3,
wherein identifying the subtitles of that slide from the textual metadata includes:
  for each subtitle, obtaining a numerical value from the textual metadata indicative of how that subtitle is displayed in that slide; and
wherein storing the subtitles in the title array includes:
  for each subtitle, providing a decision to store or not store that subtitle in the title array based on the numerical value.

5. A method as in claim 4,
wherein the numerical value is indicative of a font size of that subtitle; and
wherein providing the decision to remove or not remove that subtitle from the title array based on the numerical value includes:
  comparing the font size to a threshold font size,
  not storing that subtitle in the title array when the font size of that subtitle is smaller than a threshold font size, and
  storing that subtitle in the title array when the font size of that subtitle is greater than or equal to the threshold font size.

6. A method as in claim 4,
wherein the numerical value is indicative of a length of time that slide was displayed during the first online meeting;
wherein storing the subtitles in the title array includes:
  ranking the subtitles according to the numerical value; and
wherein providing the decision to store or not store that subtitle in the title array based on the numerical value includes:
  storing a subtitle in the title array when the subtitle is ranked above a threshold ranking;
  not storing a subtitle in the title array when the subtitle is ranked below the threshold ranking.

7. A method as in claim 6, further comprising:
prior to providing the decision, producing the threshold ranking according to a prespecified length limit.

8. A method as in claim 3, further comprising:
storing words contained in both the titles in the title array and the uncommon word list in a list of keywords within the respective electronic summary; and
not storing words contained in the titles in the title array but not in the uncommon word list in the list of keywords within the respective electronic summary.

9. A method as in claim 8,
wherein storing the words contained in both the titles in the title array and the uncommon word list in a list of keywords within the respective electronic summary includes:
  storing the words contained in both the subtitles in the title array and the uncommon word list in a list of keywords within the respective electronic summary.

10. A method as in claim 9,
wherein storing the words contained in both the titles and subtitles in the title array and the uncommon word list in a list of keywords includes:
  ranking the words in the list of keywords according to a numerical value indicative of a length of time that slide was displayed during the particular online meeting; and
  removing particular words from the list of keywords when the particular words are ranked below a threshold ranking.

11. A method as in claim 1,
wherein at least one slide of the set of slides is a summary slide containing a set of sentences;
wherein generating the electronic summary includes:
  for the summary slide, storing each sentence of the set of sentences in the title array.

12. A method as in claim 1,
wherein generating the respective electronic summary includes:
  performing an optical character recognition (OCR) operation on particular content of the first online meeting to produce words of the electronic summary.

13. A method as in claim 12,
wherein performing the OCR operation on the particular content includes:
  measuring a style including height, color, emphasis, and font of characters of the words of the respective electronic summary within the particular content; and
generating the electronic summary further includes:
  identifying a title of the first content based on the measured styles of the characters of the words of the electronic summary within the first content.

14. A method as in claim 1,
wherein the repository stores a second electronic summary of the second online meeting; and
wherein the method further comprises:
  providing a navigation tool to a user, the navigation tool enabling a user to perform a search over the first electronic summary and the second electronic summary to find particular content presented during the first online meeting and the second online meeting.

15. A method as in claim 14,
wherein the electronic summary further includes text formatted according to a markup language configured to provide links to particular content of the first online meeting;
wherein providing the navigation tool to the user includes:
  displaying hyperlinks within the electronic summary that, when clicked on by the user, display particular content of the first content of the first online meeting.

16. A method as in claim 15,
wherein the first content includes a set of images presented during the first online meeting;
wherein the electronic summary further includes a thumbnail image of each of the set of images; and
wherein providing the navigation tool to the user further includes:
embedding a hyperlink within the set of thumbnail images.

17. An electronic apparatus constructed and arranged to organize content of online meetings, the apparatus comprising:
a network interface;
memory; and
a controller including controlling circuitry coupled to the memory, the controlling circuitry being constructed and arranged to:
collect first content presented during a first online meeting;
generate an electronic summary of the first online meeting, the electronic summary providing a textual description of the first content of the first online meeting based on textual metadata derived from the first online meeting; and
store the electronic summary and the first content of the first online meeting in a repository, the repository also storing second content of a second online meeting;
wherein the first content includes a set of slides presented during the first online meeting, each slide of the set of slides including a title; and
wherein the controlling circuitry constructed and arranged to generate the electronic summary is further constructed and arranged to:
for each slide, identify the title of that slide from the textual metadata derived from the first online meeting, and
store the titles in a title array within the electronic summary, the textual description of the content being derived from the titles in the title array;
wherein each title in the title array contains a set of words;
wherein the repository also stores a list of uncommon words; and
wherein the controlling circuitry constructed and arranged to generate the electronic summary is further constructed and arranged to:
remove titles from the title array that do not contain any words contained in the list of uncommon words.

18. A computer program product having a non-transitory, computer-readable storage medium which stores instructions that, when executed by a controller, causes the controller to carry out a method of organizing content of online meetings, the method comprising:
collecting first content presented during a first online meeting;
generating an electronic summary of the first online meeting, the electronic summary providing a textual description of the first content of the first online meeting based on textual metadata derived from the first online meeting; and
storing the electronic summary and the first content of the first online meeting in a repository, the repository also storing second content of a second online meeting;
wherein the first content includes a set of slides presented during the first online meeting, each slide of the set of slides including a title; and
wherein generating the electronic summary includes:
for each slide, identifying the title of that slide from the textual metadata derived from the first online meeting, and
storing the titles in a title array within the electronic summary, the textual description of the content being derived from the titles in the title array;
wherein each title in the title array contains a set of words;
wherein the repository also stores a list of uncommon words; and
wherein generating the electronic summary further includes:
removing titles from the title array that do not contain any words contained in the list of uncommon words.

19. A method of organizing content of online meetings, the method comprising:
collecting first content presented during a first online meeting;
generating an electronic summary of the first online meeting, the electronic summary providing a textual description of the first content of the first online meeting based on textual metadata derived from the first online meeting; and
storing the electronic summary and the first content of the first online meeting in a repository, the repository also storing second content of a second online meeting;
wherein the first content includes a set of slides presented during the first online meeting, each slide of the set of slides including a title; and
wherein generating the electronic summary includes:
for each slide, identifying the title of that slide from the textual metadata derived from the first online meeting, and
storing the titles in a title array within the electronic summary, the textual description of the content being derived from the titles in the title array;
wherein generating the electronic summary further includes:
for each slide, identifying subtitles of that slide from the textual metadata derived from the first online meeting, and
storing the subtitles in the title array, the textual description of the content also being derived from the subtitles in the title array;
wherein the method further comprises:
storing words contained in both the titles in the title array and the uncommon word list in a list of keywords within the respective electronic summary; and
not storing words contained in the titles in the title array but not in the uncommon word list in the list of keywords within the respective electronic summary.

* * * * *